US012760192B2

(12) United States Patent
Niedermeyer

(10) Patent No.: US 12,760,192 B2
(45) Date of Patent: Oct. 13, 2026

(54) 3D PRINTING COMPOSITION WITH LIGHT SCATTERING NANOPARTICLES TO ASSIST CURING

(71) Applicant: EVOQ NANO, INC., Salt Lake City, UT (US)

(72) Inventor: William H. Niedermeyer, West Jordan, UT (US)

(73) Assignee: EVOQ NANO, INC., Salt Lake City, UT (US)

( * ) Notice: Subject to any disclaimer, the term of this patent is extended or adjusted under 35 U.S.C. 154(b) by 722 days.

(21) Appl. No.: 17/969,299

(22) Filed: Oct. 19, 2022

(65) Prior Publication Data

US 2023/0133966 A1 May 4, 2023

Related U.S. Application Data

(60) Provisional application No. 63/273,023, filed on Oct. 28, 2021.

(51) Int. Cl.

| | |
|---|---|
| ***C09D 11/101*** | (2014.01) |
| ***B33Y 70/10*** | (2020.01) |
| ***C09D 11/037*** | (2014.01) |
| ***C09D 11/103*** | (2014.01) |
| ***C09D 11/104*** | (2014.01) |
| ***C09D 11/107*** | (2014.01) |
| ***C09D 11/108*** | (2014.01) |

(52) U.S. Cl.

CPC ............ *C09D 11/101* (2013.01); *B33Y 70/10* (2020.01); *C09D 11/037* (2013.01); *C09D 11/103* (2013.01); *C09D 11/104* (2013.01); *C09D 11/107* (2013.01); *C09D 11/108* (2013.01)

(58) Field of Classification Search

None

See application file for complete search history.

(56) References Cited

U.S. PATENT DOCUMENTS

| | | | |
|---|---|---|---|
| 6,730,156 | B1 | 5/2004 | Windisch et al. |
| 2007/0003603 | A1 | 1/2007 | Karandikar et al. |
| 2009/0155592 | A1 | 6/2009 | Lee et al. |
| 2009/0233090 | A1 | 9/2009 | Wong et al. |
| 2012/0301530 | A1 | 11/2012 | Uhlmann et al. |
| 2016/0297142 | A1 | 10/2016 | Bheda et al. |
| 2017/0130034 | A1 | 5/2017 | Hwang et al. |
| 2018/0251631 | A1 | 9/2018 | Lee |
| 2022/0411347 | A1 | 12/2022 | Niedermeyer |
| 2023/0131273 | A1 | 4/2023 | Niedermeyer |
| 2024/0336755 | A1 | 10/2024 | Niedermeyer |

FOREIGN PATENT DOCUMENTS

| | | | |
|---|---|---|---|
| EP | 2789235 | A1 | 10/2014 |

OTHER PUBLICATIONS

Hutter, E. et al. Exploitation of Localized Surface Plasmon Resonance. Advanced Materials, vol. 16, Issue 19, pp. 1685-1706. (2004) (Year: 2004).*

Eguiluz et al., "Dispersion of Ni nanoparticles into Ti(C,N) colloidal filaments for 3D printing by FFF", Open Ceramics, vol. 5, Mar. 2021, 100064, 8 Pages.

International Search Report and Written Opinion received for PCT Patent Application No. PCT/US22/047238, mailed on Feb. 8, 2023, 9 pages.

International Preliminary Report on Patentability received for PCT Patent Application No. PCT/US24/23801, mailed on Oct. 23, 2025, 8 pages.

International Search Report and Written Opinion received for PCT Patent Application No. PCT/US24/23801, mailed on Jul. 10, 2024, 9 pages.

Barcikowski et al. "Solid solution magnetic FeNi nanostrand-polymer composites by connecting-coarsening assembly" J. Mater. Chem. C. 2015, 3, 10699.

Markelonis et al. "Nanoparticle film deposition using a simple and fast centrifuge sedimentation method" Appl Nanosci (2015) 5:457-468.

Maurer et al. "Process Chain forthe Fabrication of Nanoparticle Polymer Composites by Laser Ablation Synthesis" Chem. Eng. Technol. 2017, 40, No. 9, 1535-1543.

Quintero-Quiroz et al. "Synthesis and characterization of a silver nanoparticle-containing polymer composite with antimicrobial abilities for application in prosthetic and orthotic devices" Biomaterials Research 2020, 24:13.

(Continued)

*Primary Examiner* — Sanza L. McClendon

(74) *Attorney, Agent, or Firm* — Workman Nydegger

(57) ABSTRACT

Disclosed are embodiments of 3D printing compositions that incorporate light scattering and wavelength-shifting metal nanoparticles, and systems and methods of using the 3D printing compositions. In some embodiments, the 3D printing compositions containing metal nanoparticles cure faster upon exposure to UV radiation. In some embodiments, the 3D printing compositions containing metal nanoparticles scatter incoming UV light throughout printed layers of the 3D printing compositions. It is proposed that metal nanoparticles produced by high energy methods possessing smooth spherical morphology and narrow size distributions can be integrated into 3D printing compositions to mitigate the risk of over-curing due to the light-scattering and/or down-shifting effect of the nanoparticles. A method for adding the nanomaterials to the 3D printing compositions in a non-interruptive process is also disclosed.

20 Claims, No Drawings

(56) References Cited

OTHER PUBLICATIONS

Schwenke et al. "Laser-Based Generation of Nanocomposites without Matrix-Coupling Agents for Bioactive Medical Devices" Chemie Ingenieur Technik 2013, 85, No. 5, 740-746.
International Search Report and Written Opinion received for PCT Patent Application No. PCT/US2025/054693, mailed on Mar. 13, 2026, 16 pages.

* cited by examiner

3D PRINTING COMPOSITION WITH LIGHT SCATTERING NANOPARTICLES TO ASSIST CURING

CROSS-REFERENCE TO RELATED APPLICATION

This Application claims the benefit of U.S. Provisional Application No. 63/273,023, filed Oct. 28, 2021, which is incorporated herein by reference in its entirety.

BACKGROUND

Technical Field

This disclosure relates to 3D printing compositions and systems that contain light scattering and wavelength-shifting nanoparticles, and uses thereof.

Related Technology 3D printing, or additive manufacturing, is the construction of a three-dimensional object from a computer-aided design (CAD) model or a digital 3D model. The term "3D printing" can refer to a variety of processes in which material is deposited, joined, or solidified under computer control to create a three-dimensional object, with material being added together (such as plastics, liquids, or powder grains being fused together), typically by depositing successive layers of material to yield a printed article of manufacture.

There are many different types of additive manufacturing. Non-limiting examples include vat photopolymerization, material jetting, binder jetting, powder bed fusion, material extrusion, directed energy deposition, and sheet lamination. The main differences between these processes are in the way layers are deposited to create parts and in the materials that are used.

Some methods melt or soften the material to produce the layers. For example, in fused filament fabrication, also known as fused deposition modeling (FDM), the model or part is produced by extruding small beads or streams of material that harden immediately to form layers. A filament of thermoplastic polymer, metal wire, or other material is fed into an extrusion nozzle head (3D printer extruder), which heats the material and turns the flow on and off. FDM is somewhat restricted in the variation of shapes that may be fabricated.

Another technique fuses parts of the layer and then moves upward in the working area, adding another layer of granules and repeating the process until the piece has built up. This process uses the unfused media to support overhangs and thin walls in the part being produced, which reduces the need for temporary auxiliary supports for the piece.

Other methods cure liquid materials using different sophisticated technologies, such as stereolithography. Photopolymerization is primarily used in stereolithography to produce a solid part from a liquid. In some systems, photopolymer materials are sprayed onto a build tray in ultra-thin layers (between 16 and 30 μm) until the part is completed. Each photopolymer layer is cured with UV light after it is jetted, producing fully cured models that can be handled and used immediately, without post-curing. Yet another approach uses a synthetic resin that is solidified using LED lights.

Generally, 3D printed products, particularly those crafted from resins, require curing during or after production. Resin printed products may be tacky or soft after printing and can require long cure times. Exposure to ultraviolet (UV) light or other radiation hardens the printed product, resulting in a smooth finish and a product that can be handled. UV radiation can, however, be very harsh on the product, and long exposure times may lead to over curing of the product. In addition, the product may become brittle or appear chalky if over cured. UV light can also degrade certain polymers by breaking chemical bonds.

Ultraviolet radiation A ("UVA radiation") is generally considered to lie within the range of about 315 to about 400 nanometers in wavelength. Ultraviolet radiation B ("UVB radiation") is generally considered to lie within the range of about 280 to about 315 nanometers in wavelength. Ultraviolet radiation C (UVC) is generally considered to lie within the range of about 100 to about 280 nanometers in wavelength.

SUMMARY

Disclosed are embodiments of 3D printing compositions that are modified to include light-scattering and wavelength-shifting nanoparticles, and systems and methods of using the 3D printing compositions to make solid parts. In some embodiments, the 3D printing compositions containing light-scattering and wavelength-shifting nanoparticles cure faster upon exposure to UV radiation. In some embodiments, the 3D printing compositions containing nanoparticles scatter incoming UV light throughout printed layers of the 3D printing compositions. In some embodiments, the 3D printing compositions containing nanoparticles accelerate the polymerization process.

It has been found that metal nanoparticles produced by high energy methods possessing smooth spherical morphologies and narrow size distributions can be integrated into 3D printing compositions to mitigate the risk of over-curing, which mitigation is accomplished by the light scattering and wavelength-shifting effects of the nanoparticles. A method for incorporating the nano materials into the 3D printing compositions in a non-interruptive process is also disclosed.

In some embodiments, a metal nanoparticle composition comprises (1) a carrier and (2) a plurality of metal nanoparticles having a particle size and a particle size distribution selected so as to effectively scatter and/or down-convert incoming UV radiation into longer wavelength and less energetic (and less destructive) radiation. In some embodiments, a 3D printing composition may be a two-part composition, where metal nanoparticles are included in one or both parts of the composition.

In some embodiments, a method of curing materials exposed to UV radiation comprises: (1) applying a 3D printing composition comprising a carrier and metal nanoparticles onto an area or substrate, (2) irradiating the composition with UV light, and (3) the nanoparticles in the 3D printing composition scattering and/or down-converting at least a portion of the UV light incident upon the area or substrate to cure the 3D printing composition.

In some embodiments, metal nanoparticles can comprise spherical (e.g., silver) metal nanoparticles and/or coral-shaped metal (e.g., gold) nanoparticles. In some embodiments the coral-shaped metal nanoparticles can be used together with spherical metal nanoparticles (e.g., in order to augment the desired effects of spherical-shaped metal nanoparticles).

In some embodiments, nanoparticle compositions, such as spherical nanoparticle or multi-component nanoparticle compositions, include a stabilizing agent capable of maintaining the nanoparticles in solution while retaining the functionality of the nanoparticles. In some embodiments, the metal nanoparticles can be sprayed or coated onto polymeric granules or pellets used in the 3D printing process.

To manufacture 3D compositions from thermoplastic materials, thermoplastic polymer granules can be coated with metal nanoparticles, such as by dispersing the metal nanoparticles in a volatile solvent (e.g., ethanol, isopropyl alcohol, or acetone), applying the dispersion to the polymer granules, and allowing the solvent to evaporate, leaving behind granules which are surface coated with the metal nanoparticles. When the metal nanoparticle coated polymer granules are melted within forming equipment, such as an auger, extruder, or 3D printer, the metal nanoparticles become distributed throughout the molten thermoplastic polymer and the resulting printed materials made therefrom. The metal nanoparticles can protect the printed part from subsequent exposure to UV radiation by down-converting it to a lower energy wavelength that is less destructive or non-destructive.

In the case of two-part curable resins used to make materials, metal nanoparticles can be included in one or both parts. When the two parts are mixed together, the metal nanoparticles are blended throughout the mixture and will solidify in place within whatever product the composition is shaped into. The metal nanoparticles will protect the printed part from subsequent exposure to UV radiation by down-converting it to a lower energy wavelength.

In summary, advantages of the disclosed compositions and methods include:

1. printing is faster because curing radiation is localized and distributed by the metal nanoparticles, facilitating absorption and transfer to the polymer for faster polymer chain formation between the nanoparticles;
2. printing is stronger with higher tensile strength due to the presence of evenly distributed metal nanoparticles, which leads to more even polymerization;
3. printing is more accurate in detail as the light is absorbed in a more localized domain, which reduces bleed over from reflectance or refraction;
4. printed parts containing silver nanoparticles at a concentration higher than about 1 mg/kg can have antimicrobial properties; and
5. stronger supports for resin printing, by virtue of the stronger polymer, allows for smaller support framing, reducing clean up and allowing for larger prints to be supported from the build plate. This also reduces waste of resin and may have a smaller point of attachment of the support to the printed part, making separation of the support from the part easier.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

DETAILED DESCRIPTION

Disclosed are embodiments of 3D printing compositions that are modified to incorporate with light-scattering and wavelength-shifting metal nanoparticles, and systems and methods of using the 3D printing compositions. In some embodiments, the 3D printing compositions containing metal nanoparticles cure faster upon exposure to UV radiation. In some embodiments, the 3D printing compositions containing metal nanoparticles scatter and more evenly distribute incoming UV light throughout printed layers of the 3D printing compositions.

I. INTRODUCTION

The term "nanoparticle" often refers to particles having a largest dimension of less than 100 nm. Bulk materials typically have constant physical properties regardless of size, but at the nanoscale, size dependent properties are often observed. Thus, properties of materials change as their size approaches the nanoscale and as the percentage of atoms at the surface of a material becomes significant. For bulk materials larger than one micrometer (or micron), the percentage of atoms at the surface is insignificant in relation to the number of atoms in the bulk of the material. The interesting and sometimes unexpected properties of nanoparticles are therefore largely due to the large surface area of the material, which dominates the contributions made by the relatively small bulk of the material.

Examples of metal nanoparticles and nanoparticle compositions that can be used herein are disclosed in U.S. Pat. Nos. 9,849,512, 9,434,006, 9,919,363, 10,137,503, and 10,610,934, which are incorporated herein by reference.

Because the diameters of these metal nanoparticles are nanoscale, the individual nanoparticles may exhibit surface plasmon resonance. The surface plasmon resonance is a non-radiative electromagnetic wave that propagates parallel to the surface of the metal nanoparticles. Being on the surface, and thus at a boundary, the surface plasmon resonance wave is very sensitive to any change at the boundary, such as the absorption of solar radiation to the conducting surface.

This phenomenon is sometimes referred to as localized surface plasmon resonance (LSPR). LSPR are collective electron charge oscillation in metallic nanoparticles that are excited by light. They exhibit enhanced near-field amplitude at the resonance wavelength. This field is highly localized at the nanoparticle and decays away from the nanoparticle, though far-field scattering by the particle is also enhanced by the resonance. Light intensity enhancement is a very important aspect of LSPRs, and localization means the LSPR has very high spatial resolution (subwavelength), limited only by the size of nanoparticles. Because of the enhanced field amplitude, effects that depend on the amplitude such as magneto-optical effect are also enhanced by LSPRs. Upon absorption of UV radiation, the plasmon resonance transfers energy locally in the polymer chain, which causes the polymerization to occur faster and more uniformly. The plasmon resonance may also have a light-scattering effect.

Absorption of solar radiation is much higher in materials composed of nanoparticles than it is in thin films of continuous sheets of material. In both solar photovoltaics (PV) and solar thermal applications, by controlling the size, shape, and material of the particles, it is possible to control solar absorption. The size-dependent property changes of nanoparticles include quantum confinement in semiconductor particles, surface plasmon resonance in some metal particles, and super-para-magnetism in magnetic materials.

In some embodiments, gold (Au) nanoparticles are included in the 3D printing compositions to down-shift incoming UV radiation. The gold nanoparticles may down-convert the light waves into less energetic and less harmful light of longer wavelength. In some embodiments, gold nanoparticles may down-convert light waves towards the red zone of the light spectrum. In some embodiments, gold nanoparticles can be spherical. In some embodiments, gold nanoparticles are approximately 1 to 40 nm in diameter.

In some embodiments, silver (Ag) nanoparticles are included in the 3D printing compositions. The absorption wavelength observed by plasmon resonance of silver nanoparticles in isopropyl alcohol is approximately 405 nm, which is the wavelength required for curing in the 3D printing process using UV curable resins. By adding these particles with an acceptable carrier solvent, such as ethanol, isopropyl alcohol, or acetone, the additive increases locally to the polymerization chains more energy, allowing for faster printing.

This makes 3D printing by resin or stereolithography more economical and feasible, particularly where long cure times have limited its use in many products and industries. The concentration of particles to have the effect is 1-2 mg/L. For example, concentrations of particles at 10 mg/L (10 ppm) can be used with 1/10 dilution to achieve the low ranges of effect. Concentrations greater than 2 mg/L may have diminishing returns. Incorporating the particles into the final 3D printed product also enhances final curing. Without the particles present, the final cure can be uneven, resulting in lower tolerance matching products from the origin digital construct of the printed body. Advantageously, the amount of silver nanoparticles present can have a secondary biostatic effect on the surface of the 3D printed part to limit, prevent or eradicate bacteria growth.

II. NANOPARTICLE COMPOSITIONS

Metal nanoparticles and nanoparticle compositions typically include nonionic, ground state, metal nanoparticles with no external edges or bond angles that would otherwise release metal ions. Nanoparticle compositions may include spherical metal nanoparticles, coral-shaped metal nanoparticles, or a combination of the two.

Nonionic, ground state, spherical metal nanoparticles with no external edges or bond angles that would otherwise release metal ions, and compositions containing such nanoparticles, can be made according to the disclosure of U.S. Pat. Nos. 9,849,512, 10,137,503, and 10,610,934. Nonionic, ground state, coral-shaped metal nanoparticles with no external edges or bond angles that would otherwise release metal ions, and compositions containing such nanoparticles, can be made according to the disclosure of U.S. Pat. No. 9,919,363. Compositions that contain a mixture of spherical metal nanoparticles and coral-shaped metal nanoparticles are disclosed in U.S. Pat. No. 9,434,006. The foregoing patents are incorporated herein by reference in their entirety.

a. Multi-Component Nanoparticle Compositions

In some embodiments, coral-shaped metal nanoparticles can be used in conjunction with spherical metal nanoparticles. In general, spherical metal nanoparticles can be smaller than coral-shaped metal nanoparticles, and in this way they can provide very high surface area for catalyzing desired reactions or providing other desired benefits. On the other hand, the generally larger coral-shaped nanoparticles can exhibit higher surface area per unit mass compared to spherical nanoparticles because coral-shaped nanoparticles have internal spaces and surfaces rather than a solid core and only an external surface.

In some cases, providing nanoparticle compositions containing both spherical-shaped and coral-shaped nanoparticles can provide synergistic results. For example, coral-shaped nanoparticles can help carry and/or potentiate the activity of spherical nanoparticles in addition to providing their own unique benefits. For example, smaller particles may offer better relative protection against UVB radiation, while relatively larger particles may offer better protection against UVA radiation. In some embodiments, a combination of spherical and coral-shaped nanoparticles can lead to synergistic, broad-spectrum protection with a greater amount of protection (e.g., amount of UV radiation reflected) per amount of active ingredient relative to single sized and/or shaped compositions.

In some embodiments, the mass ratio of spherical nanoparticles to coral-shaped nanoparticles in the nanoparticle composition can be in a range of about 1:1 to about 50:1, or about 2.5:1 to about 25:1, or about 5:1 to about 20:1, or about 7.5:1 to about 15:1, or about 9:1 to about 11:1, or about 10:1. The particle number ratio of spherical nanoparticles to coral-shaped nanoparticles in the nanoparticle composition can be in a range of about 10:1 to about 500:1, or about 25:1 to about 250:1, or about 50:1 to about 200:1, or about 75:1 to about 150:1, or about 90:1 to about 110:1, or about 100:1.

In some embodiments, spherical metal nanoparticles can have a diameter of about 40 nm or less, about 35 nm or less, about 30 nm or less, about 25 nm or less, about 20 nm or less, about 15 nm or less, about 10 nm or less, about 7.5 nm or less, or about 5 nm or less. The spherical metal nanoparticles can have a particle size distribution wherein at least 99% of the metal nanoparticles have a particle size within 30% of the mean diameter, or within 20% of the mean diameter, or within 10% of the mean diameter and/or wherein at least 99% of the spherical nanoparticles have a diameter within ±3 nm of the mean diameter, or within ±2 nm of the mean diameter, or within ±1 nm of the mean diameter. The spherical nanoparticles can have a $\xi$-potential of at least about ±10 mV (absolute value), or at least about ±15 mV, or at least about ±20 mV, or at least about ±25 mV, or at least about ±30 mV.

In some embodiments, at least a portion of the spherical and/or coral-shaped nanoparticles can comprises at least one metal selected from the group consisting of gold, platinum, silver, palladium, rhodium, osmium, ruthenium, rhodium, rhenium, molybdenum, copper, iron, nickel, tin, beryllium, cobalt, antimony, chromium, manganese, zirconium, tin, zinc, tungsten, titanium, vanadium, lanthanum, cerium, heterogeneous mixtures thereof, and alloys thereof. Nanoparticles comprised of silver, gold, and mixtures and alloys thereof can be particularly effective.

In some embodiments, at least one of either the first or second set of metal nanoparticles is selected so as to selectively reflect, block, down-convert, and/or scatter a particular range of solar radiation. For example, the first set of metal nanoparticles may be selected as spherical metal nanoparticles having a smaller relative size and which therefore selectively reflect, scatter, and/or block more particularly UVB radiation, and a second set of metal nanoparticles may be selected as coral-shaped metal nanoparticles having a larger relative size and which therefore selectively reflect, scatter, and/or block more particularly UVA radiation. In other embodiments, the first and second set of nanoparticles may be both spherical or may be both coral-shaped, but have different sizes and/or size distributions.

In some embodiments, the compositions can include at least one spherical metal nanoparticle component and a larger coral-shaped nanoparticle component. In these embodiments, the at least one selected spherical nanoparticle component will be present in the composition in a range of between about 1 and about 15 ppm (e.g., at least 1 and at most 15 ppm) and more particularly in the range of between bout 1 and about 5 ppm (e.g., at least 1 and at most 5 ppm). Additionally, in some embodiments, the larger coral-shaped nanoparticles will be present in a range of between about 1 and about 5 ppm (e.g., at least 1 and at most 5 ppm) and more particularly between about 1 and about 3 ppm (e.g., at least 1 and at most 3 ppm). It should be understood that the upper concentration is not restricted as much by efficacy, but more by product formulation cost. Thus, in other embodiments, the spherical nanoparticle component may present at a concentration above 5 ppm and/or the coral-shaped nanoparticle component may be present at a concentration above 3 ppm.

In some embodiments, compositions containing metal nanoparticles may be utilized in a 3D printing process using curable resin materials to produce polymeric products with embedded nanoparticles. In some embodiments, compositions containing the metal nanoparticles are applied retroactively to products. For example, the composition may be a coating to be applied on the inside of plastic tubing. The composition may be coated onto the plastic tubing and provide antimicrobial and UV protection benefits.

III. 3D PRINTING & UV CURING 3D printing is the automated process of building a three-dimensional object by adding material rather than removing material (as in drilling or machining). The process is also known as additive manufacturing. The three-dimensional object is created by laying down or depositing successive layers of material until the object is finished. The most common technology used in 3D printing is fused deposition modeling (FDM). In FDM, thermoplastic material is heated and extruded through a nozzle. The nozzle deposits the molten material layer by layer onto a build platform. Each layer adheres to the one beneath it.

Another method of 3D printing is stereolithography (SLA), where the build platform is lowered into a bath filled with a special liquid photopolymer resin. The resin is light-sensitive and becomes solid when exposed to a laser beam. Each cross section of the 3D model is traced onto the layer of cured resin that came before it. This is repeated layer by layer until the 3D object is completed. In FDM the object is built from the bottom up, in SLA it is the other way round.

Examples of materials that can be used in 3D printing include silicone, epoxy, polystyrene (PS), polyethylene (PE), ethylene-vinyl acetate copolymer (EVA), polycarbonate (PC), polyurethane (PU), polyether ether ketone (PEEK), polylactic acid (PLA), polyester (PES), polypropylene (PP), polyethylene terephthalate (PET), polybutylene terephthalate (PBT), phenol-formaldehyde (PF), nylon or polyimides (PA), melamine formaldehyde (MF), polytetrafluoroethylene (PTFE), polyvinyl chloride (PVC), acrylonitrile butadiene styrene terpolymers (ABS), Kevlar, and carbon fiber-reinforced polymers. Thermoplastics, such as PE and PVC, may be melted and heated multiple times during plastics manufacturing. Thermoset plastics, such as PU and silicon, remain solid after a curing process has set the plastic.

Materials used by the 3D printer to print may come in the form of a filament coiled around a small spool. The filament is then fed into the extruder through a guide tube. In some embodiments, thermoplastics for 3D printers using the FDM method come in the shape of filaments. In other embodiments, the filaments are produced from polymer granules or pellets that are melted and extruded to fabricate the filaments.

After a product has been printed, it must be cleaned and cured. Cleaning and curing resin 3D prints demands a significant amount of attention. 3D prints can be cured with machines that wash a print and then emit UV light to cure it. Alternatively, the print may be washed with isopropyl alcohol and then placed in a UV station for curing.

Curing ensures the 3D prints are hardened properly and incorporate a stiff finish. Curing leads to the development of more chemical bonds in the print, making them very strong in turn. The element that triggers the process is light. Combining light with heat may boost the curing process and it is understood that, in some embodiments, heat can initiate the optimal curing process. Another reason why post-curing may be necessary is to negate oxygen inhibition during the process. During the printing process, oxygen can accumulate inside the outer surface of the print, making the curing process more time-consuming and difficult. By allowing the 3D print to rest in a water bath and allowing it to be directly exposed to UV light, the water barrier allows curing to occur faster. For optimal curing, a 3D print may require exposure to UV light for 15-30 minutes. Where strength, rigidity, and temperature resistance are desired in the print, it may require exposure to UV light for up to 60 minutes.

Additives may be included in the plastic pellets or granules that are melted down to create the filaments feeding the 3D printers. Colorants, stiffeners, and other enhancers may be sprayed or coated onto the pellets prior to heating. For example, colorants are often dissolved or dispersed in a volatile solvent (e.g., ethanol, isopropyl alcohol, or acetone) and then sprayed onto the pellets. Upon heating, the volatile solvent will evaporate off, leaving the colorant evenly distributed among the pellets. The colorant will get evenly incorporated into the melted plastic and result in a uniformly colored product. Other additives may similarly be incorporated into the final plastic products.

Metal nanoparticles may be incorporated into a 3D printing composition. For example, metal nanoparticles may be incorporated into a thermoplastic filament fed to a 3D printer. Incorporation of metal nanoparticles in the 3D printing composition disperses the metal nanoparticles evenly throughout a final printed product (a print). The evenly dispersed metal nanoparticles enable faster and more uniform curing of the 3D print when exposed to UV radiation. For example, when a metal nanoparticle is hit with incoming UV radiation, the plasmon resonance exhibited on the surface of the metal nanoparticle will absorb the incoming radiation. This radiation will then be resonated (or transferred) locally away from the metal nanoparticle. This transfer in energy causes the resin to cure and enhances polymerization of the resin. While the plasmon resonance-UV interaction shows up as absorption, it is truly a Raman spectroscopy or scattering effect inside the resin.

Metal nanomaterials of sizes in the range of 10 to 40 nm have loose dielectric fields. When a large quantity of particles are placed close together, the dielectric effect on light waves passing through does not attenuate but can be frequency shifted either toward the red or blue regions of the electromagnetic spectrum. Polymer compositions that have sufficient nanoparticles to affect the UV rays and shift them toward the red region reduce the entry per photon at a level that reduces overall damage.

In some embodiments, the 3D printing compositions can include metal nanoparticles having a high refractive index in order to reflect and/or scatter incident UV radiation. For example, nanoparticles and/or multi-component nanoparticles used in 3D printing compositions of the present disclosure can have a refractive index for UVA and/or UVB radiation of about 1.5 to about 4.6, or from about 2.0 to about 4.0, or from about 2.5 to about 3.5. In some embodiments, the refractive index of the nanoparticles and/or multi-component nanoparticles can be higher with respect to UVB radiation relative to UVA radiation (e.g., the refractive index increases with decreasing wavelength). In other embodiments, however, the refractive index of the nanoparticles and/or multi-component nanoparticles can be lower with respect to UVB radiation relative to UVA radiation (e.g., the refractive index increases with increasing wavelength).

In some embodiments, the 3D printing compositions can include metal nanoparticles having a photostability such that upon exposure to solar radiation (e.g., in an environment with a relatively high UV index of about 15), the nanoparticles and/or multi-component nanoparticles do not degrade or lose their effectiveness in scattering and/or down-shifting UV radiation (e.g., remain about 100% as effective, or remain about 95-100% as effective, or about 90-100% as effective, or about 80-100% as effective) over at least a given time period (e.g., about 1 hour, or about 2-4 hours, or about 4-6 hours, about 6-12 hours or longer, or even indefinitely).

In some embodiments, a 3D printing composition exhibits radiation protection properties. For example, some embodiments include a plurality of nanoparticles (e.g., beryllium and/or gold) configured to absorb harmful radiation (e.g., alpha particles, beta particles, and/or gamma radiation), thereby reducing or eliminating an amount of radiation passing through the nanoparticle treated material.

In some embodiments, gold (Au) nanoparticles uniformly dispersed throughout a plastics material down-convert incoming UV radiation into less harmful UV radiation. In some embodiments, the gold nanoparticles may down shift incoming UV radiation by at least 100 nm (e.g., approximately 200 nm). In some embodiments, the gold nanoparticles may down-shift incoming UV radiation from UV light to visible light. In some embodiments, the gold nanoparticles may down-shift incoming UV radiation from UV wavelengths toward red and/or green wavelengths.

In some embodiments, gold nanoparticles uniformly dispersed throughout a 3D printing composition may absorb incoming UV radiation at a high energy and emit a lower energy wavelength, thereby imparting UV protection to the polymer composition and products made therefrom. Unexpectedly, the ability of the gold nanoparticles produced by methods outlined in U.S. Pat. No. 9,434,006 B2, incorporated herein by reference, to perpetually perform this down shift in wavelength/radiation energy does not deteriorate with use. That is, the gold nanoparticles retain their UV protection capabilities and are not degraded by incoming UV radiation. This beneficially prolongs the effectiveness of the polymer composition and plastic products made therefrom. This also means that lower concentrations of gold nanoparticles, or other wavelength shifting nanoparticles, may be used, resulting in products that are cheaper to produce while maintaining their integrity.

IV. METHOD OF MANUFACTURING 3D PRINTING COMPOSITIONS

Methods of adding nanoparticles to 3D printing compositions in a non-interruptive manner are disclosed. Due to the methods of making the metal nanoparticles (referenced above), they can be produced in liquids directly applicable to plastic pellets or granules. For example, laser-ablated nanoparticles (such as those described in U.S. Pat. Nos. 9,849,512 B2, 9,434,006 B2 and/or 9,919,363 B2) may be dispersed in a solvent such as alcohol and applied to plastic pellets or granules prior to an extrusion or injection molding process. Example solvents include, but are not limited to, ethanol, isopropyl alcohol, or acetone). When the plastic pellets or granules coated with the nanoparticles are heated, the volatile solvent will evaporate off and the nanoparticles will be uniformly incorporated into the resulting filament. The solvent may be a volatile solvent, gaseous solvent, or other appropriately evaporative solvent.

The resulting filament containing a uniform dispersion of nanoparticles may then be used in a 3D printing process to print, for example, plastic-based products. The final printed product will advantageously contain a uniform dispersion of nanoparticles throughout the entirety of the print. For example, tubing made from the 3D printing composition would contain a uniform distribution of nanoparticles to enable it to be antimicrobial and to protect the tubing from UV radiation.

In the case where the resin is light curable, the incorporation of metal nanoparticles into the composition causes more uniform and complete curing the resin due to the light-absorption and light-scattering effects of the metal nanoparticles.

The finished 3D printed object will be protected from UV radiation and microbial growth. The metal nanoparticles embedded into the 3D print are capable of down-converting incoming UV radiation to lower energy radiation. This beneficially prevents general degradation of the 3D print from UV radiation. The 3D print will last longer without cracking, discoloration, fogging, leakage and/or failing completely.

Advantages of the disclosed compositions and methods include:

1. printing is faster because curing radiation is localized and distributed by the metal nanoparticles, facilitating absorption and transfer to the polymer for faster polymer chain formation between the nanoparticles;
2. printing is stronger with higher tensile strength due to the presence of evenly distributed metal nanoparticles, which leads to more even polymerization;
3. printing is more accurate in detail as the light is absorbed in a more localized domain, which reduces bleed over from reflectance or refraction;
4. printed parts containing silver nanoparticles at a concentration higher than about 1 mg/kg can have antimicrobial properties; and
5. stronger supports for resin printing, by virtue of the stronger polymer, allows for smaller support framing, reducing clean up and allowing for larger prints to be supported from the build plate. This also reduces waste of resin and may have a smaller point of attachment of the support to the printed part, making separation of the support from the part easier.

V. EXAMPLES

Example 1

Nanoparticles were suspended in 99.9% isopropyl alcohol. Inductive Coupled Plasma Optical Emission Spectrophotometry (ICPOES) was used to verify nanoparticle concentration. Dynamic Light Scattering (DLS) was used to verify nanoparticle size, which was found to be approximately 6 to 10 nm. STEM imaging with Electron Loss Spectroscopy (ELS) verified surface composition and shorter bond lengths.

Example 2

A method was successfully employed to spray industry standard pellets. The sprayed pellets were then extruded through a hot mixer into a filament. The filament was cross sectioned with a diamond edge cutter to under 100 nm thickness, after encasing in ECON polymer to protect the filament from damage. Tomed slices of the filament were used for STEM/EDS imaging. The nanoparticles successfully integrated with the plastic and did show an interesting, uniform distribution that was not exclusive with the plastic polymer chains. The nanoparticles appear to be free to move about the plastic if a fluid force and temperature or energy gradient is present.

VI. ADDITIONAL TERMS & DEFINITIONS

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A method of 3D printing, comprising:

providing a 3D printing composition comprising a thermoplastic polymer or curable resin and metal nanoparticles, wherein the metal nanoparticles are present in a concentration of 1 to 15 ppm;

forming the 3D printing composition into a desired object; and causing or allowing the composition to harden to form a 3D printed part.

2. The method of claim 1, wherein the metal nanoparticles comprise silver nanoparticles.

3. The method of claim 1, wherein the metal nanoparticles comprise gold nanoparticles.

4. The method of claim 1, wherein the metal nanoparticles comprise a combination of gold and silver nanoparticles.

5. The method of claim 1, wherein the metal nanoparticles in the 3D printing composition are configured to down-shift UV radiation to a longer wavelength.

6. The method of claim 5, wherein the metal nanoparticles down-shift UV radiation by at least 100 nm.

7. The method of claim 1, wherein the 3D printing is faster because curing radiation is localized by the metal nanoparticles, facilitating absorption and transfer to the polymer for faster polymer chain formation between the nanoparticles.

8. The method of claim 1, wherein the 3D printed product is stronger with higher tensile strength due to the presence of evenly distributed metal nanoparticles, which leads to more even polymerization of the curable resin.

9. The method of claim 1, wherein the 3D printing is more accurate in detail because light absorbed by the metal nanoparticles is in localized domains, which reduces bleed over from reflectance or refraction.

10. The method of claim 1, wherein the 3D printed part contains silver nanoparticles at a concentration greater than about 1 mg/kg to provide an antimicrobial effect.

11. The method of claim 1, wherein the 3D printing produces stronger supports for resin printing, by virtue of the stronger polymer, allowing for smaller support framing, reducing clean up, facilitating separation, and allowing for larger prints to be supported from the build plate.

12. A 3D printing composition comprising:

a thermoplastic polymer or curable resin; and metal nanoparticles combined with the thermoplastic polymer or curable resin, wherein the metal nanoparticles are present in a concentration of 1 to 15 ppm, wherein the metal nanoparticles are in the size range of 1 to 40 nm.

13. The 3D printing composition of claim 12, wherein the metal nanoparticles comprise silver nanoparticles.

14. The 3D printing composition of claim 12, wherein the metal nanoparticles comprise gold nanoparticles.

15. The 3D printing composition of claim 12, wherein the metal nanoparticles comprise silver and gold nanoparticles.

16. The 3D printing composition of claim 15, wherein a ratio of silver to gold nanoparticles is 1:1 to about 50:1, or about 2.5:1 to about 25:1, or about 5:1 to about 20:1, or about 7.5:1 to about 15:1, or about 9:1 to about 11:1, or about 10:1.

17. The 3D printing composition of claim 12, wherein the metal nanoparticles are in the size range of 10 to 30 nm, or 15 to 20 nm.

18. The 3D printing composition of claim 12, wherein the metal nanoparticles are present in a concentration of 1.5 to 10 ppm or 2 to 5 ppm.

19. A 3D printed product comprising:

a thermoplastic polymer or cured resin; and metal nanoparticles dispersed within the thermoplastic polymer or cured resin, wherein the metal nanoparticles are present in a concentration of 1 to 15 ppm.

20. The 3D printed product of claim 19, wherein the thermoplastic polymer or cured resin is selected from the group consisting of silicone, epoxy, polystyrene (PS), polyethylene (PE), ethylene-vinyl acetate copolymer (EVA), polycarbonate (PC), polyurethane (PU), polyether ether ketone (PEEK), polylactic acid (PLA), polyester (PES), polypropylene (PP), polyethylene terephthalate (PET), polybutylene terephthalate (PBT), phenol-formaldehyde (PF), nylon or polyimides (PA), melamine formaldehyde (MF), polytetrafluoroethylene (PTFE), polyvinyl chloride (PVC), acrylonitrile butadiene styrene terpolymers (ABS), Kevlar, and carbon fiber-reinforced polymers.

* * * * *